United States Patent [19]

Bomball et al.

[11] 4,192,783

[45] Mar. 11, 1980

[54] VEGETABLE BASED, REMOISTENABLE ADHESIVE FOR PREGUMMED TAPE

[75] Inventors: William A. Bomball; Thomas G. Swift, both of Decatur, Ill.

[73] Assignee: A. E. Staley Manufacturing Company, Decatur, Ill.

[21] Appl. No.: 909,855

[22] Filed: May 26, 1978

Related U.S. Application Data

[63] Continuation of Ser. No. 490,478, Jul. 22, 1974, abandoned, which is a continuation-in-part of Ser. No. 344,658, Mar. 26, 1973.

[51] Int. Cl.² ............................................ C08L 89/00
[52] U.S. Cl. ........................................ 260/8; 106/130; 106/197 R; 106/197 C; 106/212; 106/213; 260/17 R; 260/17.4 GC; 260/17.4 ST; 260/29.6 WA

[58] Field of Search ............... 106/210, 213, 130, 135, 106/212, 197 R, 197 C; 260/17.4 GC, 17.4 ST, 8, 29.6 WA, 17 R

[56] References Cited

U.S. PATENT DOCUMENTS

| 3,095,391 | 6/1963 | Brockway et al. | 17.4 GC/ |
| 3,200,094 | 8/1965 | Sederlund et al. | 260/17.4 ST |
| 3,408,214 | 10/1968 | Mentzer | 106/213 |

Primary Examiner—Lorenzo B. Hayes
Attorney, Agent, or Firm—Charles J. Meyerson; Howard J. Barnett

[57] ABSTRACT

Remoistenable adhesive compositions for use on pregummed substrates comprising, in aqueous medium, a low viscosity starch-acrylamide graft copolymer.

8 Claims, No Drawings

VEGETABLE BASED, REMOISTENABLE ADHESIVE FOR PREGUMMED TAPE

This is a continuation of application Ser. No. 490,478, filed July 22, 1974, now abandoned, which is a continuation-in-part of U.S. application Ser. No. 344,658, filed Mar. 26, 1973.

Adhesive formulations using reduced viscosity, derivatized waxy maize starch as a component to replace animal glue in remoistenable pregummed tape formulations. Wet tack strength is equal or better than "all-animal glue" adhesives presently used, especially for short open times. In one embodiment, waxy maize starch is first acid hydrolyzed and then copolymerized with acrylamide monomer using a free radical initiator in an aqueous slurry. This modified starch is used in combination with carboxymethylcellulose (CMC) and polyvinyl alcohol to provide an adhesive having excellent tack and which retains good tack even after long open times, up to about 30 seconds.

In another embodiment, reduced viscosity, cyanoethylated waxy maize provides the major adhesive ingredient which replaces a substantial portion of the animal glue in the adhesive composition. It is also contemplated that substantially all of the animal glue in the new formulation can be replaced for certain applications with synthetic organic compounds, such as polyvinyl alcohol and carboxymethylcellulose, and combinations of these compounds as set forth below.

These combination vegetable-animal base adhesives and the vegetable-synthetic type adhesives may be used to replace animal glue based adhesives, and they provide improved machinability, less odor, easier remoistenability under cold room conditions and improved aging.

Of the many modified starch combinations tested, the acid-hydrolyzed, cyanoethylated starch derivative and acid hydrolyzed, and oxidatively thinned acrylamide-starch graft copolymers performed the best, especially in combination with small amounts of animal glue. It has also been found that combinations of the starch-acrylamide graft copolymers with carboxymethylcellulose and polyvinyl alcohol permit complete removal of animal glue from the formulation.

Oxidative thinning is preferably carried out prior to the acrylamide-starch copolymerization because better viscosity control is possible. For economy reasons, it is presently preferred practice to first partially thin the unmodified starch with hydrogen peroxide ($H_2O_2$) and then complete the thinning to the target viscosity range with sodium hypochlorite (NaOCl). Other oxidative thinning agents and combinations can be used, expense and convenience being the main factors considered. Enzyme hydrolysis is contemplated as another means for obtaining the desired viscosity range, but comparative costs presently dictate in favor of the peroxide/hypochlorite combination thinning method.

Applicants' adhesive composition can be used with varying amounts of plasticizers such as urea, sodium nitrate, sodium nitrate/calcium chloride combinations, sorbitol, corn syrup, sodium methacrylate, and combinations thereof. If no plasticizer is used, the shortest "open" times between remoistening the tape and application to a substrate occur. Open times of about 20 seconds are possible when about six parts of sodium nitrate or urea plasticizers are used per 100 parts of the derivatized starch/CMC/PVOH. When ten parts of either of these plasticizers is used, "open" time can be increased to more than 30 seconds.

BACKGROUND OF THE INVENTION

The fluctuating supply of materials used to make animal glues makes the availability of a replacement extremely desirable. There is an ever increasing need for shipping boxes as metropolitan areas grow with general population growth. More items must be shipped longer distances to market, and adhesives must be adapted for automated box-making equipment as labor costs increase.

Remoistenable adhesives are required for many applications, particularly corrugated box manufacture. For many years, animal glues obtained from the hooves, hides, and other water soluble proteinaceous portions of cattle, sheep, horses and pigs slaughtered for market have provided the bulk of the adhesives used to coat pregummed tapes. Such tapes are used in automatic box-making machines, which wet and apply the pregummed adhesive tapes very rapidly.

FIELD OF THE INVENTION

The fabrication of paper boxes is done on automated machinery, in which the pregummed tape is remoistened and applied almost instantaneously to the box being fabricated. It is extremely important that the tape be instantly remoistenable, and bond very rapidly upon application to the box. The properties which are useful in a remoistenable adhesive may also make the product useful as paper sizings or for coating binder applications. It is also important that the adhesive exhibit long "open time," that is, that upon remoistening, it retains good tack for relatively long periods prior to final application of the pregummed tape to a box flap. Open times of 20–30 seconds are required, and even longer open times may be needed for container manufacturing methods employing manual labor.

DESCRIPTION OF THE PRIOR ART

Canadian Patent No. 850,534, issued Sept. 1, 1970 describes a modified, acid hydrolyzed starch used in combination with hide glue and plasticizer. Only hide glues having a gel strength of at least 100 g. are recommended for use in this reference, and the specification discloses chemical modifications in only a general way. The disclosure specifically mentions that bone glue is not satisfactory for use in the composition described and claimed. All of the examples and the claims describe only acid modified or enzyme modified starches. In one example, the starch also had been hydroxyethylated to a degree of substitution of 0.07. This was apparently the only modification to this particular starch derivative (Table 3 of specification, Canadian Patent No. 850,534). Applicants have found that acid-hydrolyzed waxy maize starches and acid-hydrolyzed, derivatized starches such as with hydroxyethyl, hydroxypropyl and quaternary ammonium derivatives, do not perform as well as the acid-hydrolyzed, cyanoethylated and the acid-hydrolyzed starch-acrylamide graft copolymers of the subject invention.

U.S. Pat. No. 2,657,163 issued Oct. 27, 1953 to Walter P. Ericks, discloses that polyvinyl acetate emulsions have been added to acid converted starch adhesives to improve the initial tack (Col. 3, lines 3–13). However, these resins were found unstable under conditions of application, and Ericks reported skinning and lump formation during use. The adhesive described was intended for making laminated fiber board, having no remoistenability requirement.

A combination of polyvinyl alcohol and carboxymethyl cellulose with a major amount of clay and 0.35 parts tetrasodium phosphate is disclosed in U.S. Pat. No. 3,477,970, issued Nov. 11, 1970 to Robert H. Beeman (see Col. 9, examples 15 and 16). The product disclosed there is intended for laminating fiber board, and is not remoistenable. In addition, there is no starch in the formulation.

The coated abrasive article described in U.S. Pat. No. 3,609,284 issued Sept. 2, 1952 to Leonard R. Nestor utilized a flexible, starch-based adhesive to hold abrasive grit on the surface of a coated paper. The starch was first oxidized using sodium hypochlorite, and strong alkali was added to stop the oxidation reaction at the desired, viscosity level. In this application, there is no requirement that the adhesive be remoistenable.

U.S. Pat. No. 3,060,044, issued Oct. 23, 1962 to J. D. Lohnas et al. discloses a sizing composition including carboxymethylcellulose (CMC low viscosity) and starch. The CMC is added for oil and wax resistance, and to increase the toughness of the finished coating. There is no suggestion here that CMC be combined with polyvinyl alcohol and modified starch to produce a superior remoistenable adhesive.

Japanese Patent Specification OS 10548/74 discloses a pregummed tape coated with the reaction product of a starch hydrolyzate and acrylic acid which is also crosslinked with a metal oxide. Sweet potato starch and corn starch are used in the examples, in combination with acrylamide and acrylic acid to form copolymers. However, these modified starches were used without CMC and polyvinyl alcohol (PVOH). The particular uses described included automatic packaging machines and edge securing of plywood laminates for handling. The tape samples were made from unbleached kraft paper, which was not reinforced, and the open times varied from 2.5 seconds to 40 seconds to obtain a bond of 1,400 g.

Another Japanese Patent Specification OS 10337/74 also describes a pregummed tape adhesive which uses a starch acrylamide copolymer. In addition, this specification discloses enzyme thinning, and the use of about 7.6 parts by weight polyvinyl acetate emulsion. As with the above Japanese Specification OS 10548/74, the pregummed tape samples were made up from kraft paper (not reinforced) so the application and rewetting problems created by the uneven, reinforced tape surface are not present. Neither of these Japanese references discloses the use of a waxy maize base starch. Only sweet potato, white potato, tapioca and corn starches are disclosed. Applicants' combinations of modified starches with plasticizer, CMC/PVOH are not disclosed.

Hatch et al., U.S. Pat. No. 2,791,512 issued May 7, 1957 describes a remoistening adhesive. The adhesives of the type described in Hatch et al. have been used for many years for conventional pregummed, remoistenable tapes. However, they do not have the characteristics, initial wet tack bonding and the rewet properties (short tack time and long open times) to make them useful for the new highstrength reinforced wet tapes. Such tapes have an open mesh nylon or other type reinforcing web sandwiched and glued between two thin paper tape sheets, and then pregummed on at least one outer surface. The web causes numerous peaks and valleys in the pregummed surface which require a superior adhesive, especially needed to compensate for the irregular, uneven surface of such reinforced tapes to insure uniform rewetting and bonding of the remoistened tape to a substrate surface.

U.S. Pat. No. 3,408,214, issued Oct. 29, 1968 to Mentzer utilizes propylene and polyethylene glycols and plasticizers in combination with acid modified waxy starches, also in an attempt to obtain improved open times and improved bond times in remoistenable pregummed tapes. A hydroxyethyl ether red milo starch derivative is also described. In each example, and in the claims, either propylene glycol or polyethylene glycol is included as an essential ingredient of the adhesive formulations. The purpose of the glycol addition is to improve open time and bond time for the adhesive composition, although the reason for the improvement is not explained. Applicants have obtained superior bond times without the use of glycol additions through the particular cyanoethyl and acrylamide-starch derivatizations described herein in combinations with plasticizers, and small amounts of animal glue. A superior adhesive is also obtained without animal glue, when a combination of the subject starch derivatives with a plasticizer, and small amounts of carboxymethylcellulose and polyvinyl alcohol are employed.

Japanese Patent Specification 12635/71 discloses a remoistenable adhesive composition containing an unmodified waxy maize starch combined with hide glue, dextrin, and sodium nitrate which is recommended for paper tapes. Applicants have found that such a starch-animal glue combination does not perform as well as the acid hydrolyzed, derivatized starch compounds.

DETAILED DESCRIPTION OF THE INVENTION

This invention contemplates the use of a specifically derivatized, acid hydrolyzed, waxy maize type starches. A great number of derivatized starch were tested for use in an adhesive composition to replace animal glues in remoistenable adhesive compositions for pregummed tapes, particularly for fiber-reinforced pregummed remoistenable tapes used to fabricate corrugated paper boxes. The actual tests using a Werle Tack Tester (available from Thwing-Albert Instrument Company, Philadelphia, Pa.), showed applicants' adhesives can replace animal glue.

By actual performance, it was discovered that an acid hydrolyzed, acrylamide-starch graft copolymer performed substantially better than any of the other starch derivatives tested, as will be set forth in more detail below. An acrylamide-starch graft copolymer suitable for use in the subject invention is described in U.S. Pat. No. 3,095,391 issued June 25, 1963 to Brockway et al. It has been found that the acid hydrolysis of the graft copolymer described in the reference should be performed prior to the derivatization-polymerization step.

The specific embodiments which applicants have found successful are described in more detail below. In general terms, it can be stated that this invention contemplates the substitution in an animal glue adhesive with a thinned, specifically derivatized waxy maize starch compound. The starch derivative may be used to replace a substantial portion of the animal glue, and when polyvinyl alcohol and carboxymethylcellulose are included in the adhesive formulation, it is possible to replace substantially all of the animal glue without loss of adhesive performance upon remoistening.

The starch derivative may be thinned by any one of the well-known thinning methods, including acid hydrolysis, enzyme thinning, oxidative thinning with sodium hypochlorite, or other oxidation agents, such as hydrogen peroxide, and combinations of the above. A combination of peroxide and sodium hypochlorite thinning is presently preferred.

EXAMPLE I

The formulations were coated on standard, fiber reinforced tape sample as prescribed for the Werle Tack Tester. These samples measure 20 by 1½ inches. After drying the tapes, they were observed to be flat with no curl. These samples were then evaluated for remoistenability performance under varying test conditions on the Werle Tack Tester. The tapes were remoistened and applied to standard size paper sheets simulating paper box surfaces, and then the test tapes were pulled from the surfaces.

A one or two step cooking procedure for the adhesive formulation is selected, depending on the components of the particular formulation. Some animal glues tend to lose gel strength through hydrolysis if heated above certain specified temperatures. Therefore, a two step cooking procedure may be best. An example of such a procedure is set forth below:

Two Step Cooking Procedure: In a 250-ml beaker slurry 88 g of the derivatized starch in 101 g water. Stir and cook on the steam bath at above 190° F. for 20 minutes. Cool to 160° F. and add 4.4 g animal glue (162 g jelly strength, DARLING) preswollen in an equal weight of water. Dissolve animal glue by slight heating if required. Cool to 140°–150° F. and adjust weight for moisture loss. The adhesive is now ready for application. When the components of the adhesive are judged to be stable under higher temperatures and pre-swelling of the animal glue was not necessary, the following cooking procedure was used:

One Step Cooking Procedure: In a 250-ml beaker slurry 88 g of derivatized starch and 12 g urea in 110 g water. Stir and cook on the steam bath at above 190° F. for 20–30 minutes. Cool to 140°–150° F. and readjust weight for moisture loss. The adhesive is now ready for application. Other plasticizers, such as sodium nitrate, calcium-chloride-sodium nitrate in combination, and sorbitol can be used instead of all or part of the urea plasticizer.

As mentioned above, in connection with Example I, all the tapes were evaluated on the Werle Tack Tester, using the tentative procedure recommended by the Gummed Industries Association with some minor modifications. For example, instead of testing twelve samples, six of each tape type were tested in interests of expediency for very extensive test program. The Werle Tack Tester is manufactured by Thwing-Albert Instrument Company, Philadelphia, Pa., and is believed to be particularly suitable for comparing pregummed tape performances under substantially identical conditions. A detailed description of the test procedure is set forth below:

TAPE PREPARATION

The various adhesive formulations were applied to the felt side of International Paper 60 lb. raw gumming stock. In most cases, a #24 wire wrapped rod was preheated to 140°–150° F. and the adhesive, also at that temperature, was applied to a single drawdown. The coated sheet was allowed to dry, and was then drawn, uncoated side down, over a "breaker bar" to form in the coating a network of very fine cracks to aid in the penetration of water during remoistening. The 22 inch×9 inch sheet was cut lengthwise into 1½ inch wide strips on a paper cutter and allowed to equilibrate overnight or longer at 50% relative humidity (RH) and 75° F.

The tapes, after conditioning, were evaluated for wet tack and open time in a room held at 50% RH and 75° F. on the Werle Tack Tester. Wet tack is measured as follows:

1. The timers for open and closed time are set for open time of 2.0 seconds and a closed time of 1.0 seconds.
2. One end of the test strip is clamped in the lower jaw, adhesive side up; the other end is slid under the rod carriage and secured in the lower clamp.
3. A #24 Meyer rod (designed to deliver 17 lb. water/3000 ft.$^2$) is inserted in the rod carriage and positioned on the tape strip.
4. The top substrate, 1" wide 60# Golden Brown Nibroc Kraft Gumming Paper (Gummed Industries Association standard tape), is clamped at one end in the left top jaw and at the other end in the roller clamp. This tape is parallel to and suspended above the bottom substrate.
5. The lamination roller is placed in its cradle.
6. Machine power is switched on and operated in automatic.
7. The recording chart pen is set to allow direct reading from zero time when using a 2.0 second open time.
8. About 1 ml of distilled water is placed on the adhesive substrate directly in front of the bar carriage with a disposable pipet.
9. The start button is pushed and the wire rod deposits water on the adhesive coating.
10. After the pre-set open time, the upper substrate is bonded to the adhesive tape by a weighted rubber covered roller traveling at uniform speed.
11. After the pre-set closed time, the bottom jaw drops to take up slack in the bonded tapes and begins moving downward at a constant speed of 1 inch/second. This separates the lamination at ½ inch/second.
12. The force required to separate the lamination by peeling is continuously recorded on the chart.
13. Two arbitrary values selected from the Gummed Industries Association, Dwell Time to 20 gm peel resistance and Dwell Time to 100 gm peel resistance, are used to evaluate the relative wet tack strengths of adhesives.

Open time is measured as follows:

1. The same procedure as described in steps 1–10 above are followed except the open time timer is set to give 30 seconds open time and the closed time timer is set at about 15 seconds to allow time for removal of tests strip from the machine.
2. The lamination is not tested in the machine, but is removed and allowed to dry for a minimum of two hours.
3. After two hours, the strips are peeled by hand from the end nearest the peeling jaw. All unadhered areas are exposed and the percentage area permanently bonded is recorded as "percentage (%) fibre tear at 30 seconds open time".

The above procedure was used throughout the tests, and direct comparisons were made and recorded. This procedure generally follows the Gummed Ind. Assn. testing procedure No. 204TM67.

Many other criteria are considered, in addition to peel resistance, when evaluating the performance of a particular adhesive. However, peel resistance (rapid development of wet tack strength) is believed to be the most important criteria for evaluating remoistenable pregummed tape adhesives. The Werle Tack Tester is particularly designed to provide a good comparison of peel resistance. The shorter time periods are the better results in this test.

EXAMPLE II

The acid hydrolyzed waxy maize starch-acrylamide graft copolymer used in the adhesive composition of the invention was prepared generally as follows:

Into a 2-l. reactor (equipped with condenser, thermometer, stirrer and glass inlet tube for introducing nitrogen gas into the reaction mixture) was charged 700 gms of acid hydrolyzed, waxy maize starch, 70 gms of 1.14 M/AGU acrylamide and 1,400 ml of distilled water (previously boiled and cooled). Nitrogen gas was bubbled into the stirred mixture. After 1½ hours, 1.54 g. of ascorbic acid was added, and 2 minutes later, 1.47 ml of 10% aqueous hydrogen peroxide. Polymerization was initiated, and the temperature rose from 25.5° C. to 33.5° C. in 15 minutes. The reaction mixture was held at 38°–40° C. for about one hour, during which there was a further slight increase in the viscosity of the reaction mixture. The viscous mixture was cooled (ice-water bath) to 25° C. and the insoluble product removed by vacuum filtration. The wet filter cake was slurried 3 times with 1-l. of distilled water and vacuum filtered. The wet filter cake was broken up, air-dried and ground in a Wiley Mill (1.0 mm screen). The starch derivative so obtained contained about 12% moisture and about 3–6% polyacrylamide by wt., dsb, copolymerized with the starch.

The base starch cooked fluidity of 43–53 ml. (see Test Method ff. EG VII).

EXAMPLE III

An adhesive formulation using the starch derivative of Example II was made up as follows:

| Acid-Hydrolyzed Waxy Maize Starch-Acrylamide Graft Copolymer Adhesive Formulation | |
|---|---|
| 1. Disperse the following ingredients in 120 parts tap water at room temperature: | |
| (a) hydrolyzed waxy maize starch-acrylamide copolymer | 67 parts |
| (b) canary dextrin | 20 parts |
| (c) 81–100 gr. jelly strength animal glue | 10 parts |
| (d) Urea | 10 parts |
| (e) petrolatum | 0.25 parts |
| (f) sodium hexametaphosphate | 0.10 parts |
| 2. Heat to 185° F. with mechanical agitation and maintain at 185–205° F. for 30 minutes. | |
| 3. Cool to 135–170° F. and apply to paper or fabric coating stock using any conventional type coating equipment. | |

Typical Werle Tack Tester data for a tape prepared using the above formulation is:

| Tack time to: | |
|---|---|
| 20 g. peel resistance | 2.3 seconds |
| 100 g. peel resistance | 4.2 seconds |
| 90–100% fiber tear after 30 seconds open time. | |
| High quality animal glue tapes give typical values of: | |
| 20 g. peel resistance | 2.1 seconds |
| 100 g. peel resistance | 4.0 seconds |
| 90–100% fiber tear after 30 seconds open time. | |

The above example, comparing the high quality animal glues with the adhesive formulation of Example II, clearly shows that a completely satisfactory and economical replacement for the more scarce animal glues has been obtained. Animal glues are subject to fluctuating supply, and are generally much more expensive than the combination starch derivative-animal glue adhesives of this invention.

Until now, it has not been possible for applicants to obtain a comparable product which is primarily starch based, and which had an acceptable open time comparable to animal glue while retaining good adhesive or "gel" strength. The "gel" strength of animal glues is the primary method of determining their selling price. It is measured on a "Bloom" gelometer in which a cylinder is pressed into a gel at a rate of loading of 40 grams a second. The load required to produce a 4 mm. depression is determined. [See Ind. Eng. Chem. Anal. Ed. 2 (1930) 590; and U.S. Fed Spec. Bd. for Glue: Animal, etc., No. C.G. 451 (1931)].

The following example also utilizes the starch derivatives of the invention, but *without* any added animal glue. Instead a small amount of polyvinyl alcohol is used in combination with the acid-hydrolyzed waxy maize starch-acrylamide graft copolymer of the invention, as set forth below:

EXAMPLE IV

An adhesive formulation was made up using the starch derivative made as generally described in Example II in the following combination:

| Starch Derivative (Example III) | 90 parts |
|---|---|
| NaNO₃ (plasticizer) | 6 parts |
| Polyvinyl alcohol | 1.5 parts |
| Water | sufficient to give about 45–60% solids |

The adhesive formulation was cooked and applied to the standard test tapes as described above and compared to a high quality animal glue adhesive on the Werle Tack Tester with the following results:

| Werle Tack Test (5 seconds open time) | | |
|---|---|---|
| Peel Resistance | Example V | Animal Glue |
| 20 gms | 2.1 seconds | 2.1 seconds |
| 100 gms | 3.2 seconds | 5.4 seconds |

It is interesting to note that Example IV developed initial tack as quickly as the much more expensive animal glue formulation, and also developed full adhesive strength more rapidly than animal glue. The exact reason why the starch derivative-polyvinyl alcohol formulation can be successfully used as a complete replacement for animal glue is not known, and further study is being made of this discovery.

EXAMPLE VI

An adhesive formulation was made up using the starch derivative as generally described in Example II, and *without* animal glue (as was Example IV) but with a combination of carboxymethyl cellulose and a smaller amount of polyvinyl alcohol than was used in Example IV. To date, this combination gives the best all-around performance in tape applicator equipment, and in box making equipment in which the pregummed tape is remoistened and used in the fabrication of corrugated boxes. The tape employed in these boxes is the synthetic fiber web reinforced type, in which the synthetic nylon or "Fibreglas" fiber web or mesh is sandwiched between two thin sheets of kraft paper and the adhesive is applied to one (or both) outer exposed surfaces of the reinforced tape. The uneven, irregular surface of this type of tape makes it particularly important to have an adhesive which applies well initially to the tape, and rewets well. The following formulation has proven to be most effective in both of these important areas of performance:

| Components | | Amounts One Hundred Parts Comprising: |
|---|---|---|
| A. | Thinned waxy maize starch-acrylamide graft copolymer (similar to starch derivative of Example III) | 97.3% by weight dry substance |
| | Carboxymethylcellulose | 2.15% by weight |
| | Polyvinyl alcohol (partially hydrolyzed - about 12% acetate) | .55% by weight |
| B. | Plasticizer (NaNO₃ or Urea) | six parts |
| C. | Lubricant (Petrolatum | ½ part |
| D. | Water | sufficient to give 45-50% total solids |

If more plasticizer is used, longer open times (more than 30 seconds) are possible. Elimination of all plasticizer severely shortens "open" times. Fiber-reinforced tapes coated with the Example V adhesive composition are easily applied, have excellent initial tack times, and long "open" times, in excess of 20 seconds. Automated rewetting of these tapes is important. Such tapes rewet very uniformly, in spite of the irregular tape surfaces caused by the fiber reinforcement in the tape. The "open" times for these rewet tapes are more than 20 seconds, and can be made even longer when the plasticizers such as urea, sodium nitrate, sorbitol or the like are increased.

It is presently thought that no more than about 2.9% by weight carboxymethylcellulose (CMC) is needed to obtain the highly desirable, balanced rewetting characteristics. If an excess of CMC is used, the rewetting is excessive, since CMC is hydrophilic. Other equivalent substances are thought to be methyl ether of cellulose and hydroxyethyl cellulose. It is expected that either of these (or both) can be used to replace all, or a portion of the CMC.

The polyvinyl alcohol (PVOH) is partially hydrolyzed (88%). At present, a product available from E. I. duPont Corporation, Wilmington, Delaware is used which is sold under the trademark, "Elvanol." About 0.55% by wt. PVOH is thought to be required in adhesive formulations containing no animal glue. CMC minimum level is presently thought to be about 1% by weight CMC. About 0.25% by weight PVOH is required for 1% CMC to get the improved rewetting characteristics in a no-animal glue adhesive formulation.

The particular base starch is preferably waxy maize. It may be possible to use potato, sweet potato, tapioca, waxy milo and other root and root-type starches as the base starch, but it is believed that best results are obtained, especially for non-retrograding, viscosity stability and non-aging properties which are required for pregummed tapes. A maximum amount of PVOH presently thought to be useful is 1.9% by weight (if Elvanol is used). CMC is present at almost four times the level of PVOH, and compared to Example IV, only about one third the amount there used of PVOH is used in the preferred formulation of Example V. The exact reasons for the ratio of CMC/PVOH for these optimum results are not known. The values were established by experimentation, and careful observation. It is contemplated that lesser amounts of CMC and PVOH could be used, depending on the rewetting characteristics of the particular starch derivative employed. However, some minimum amount of CMC is required for pregummed tapes requiring the combination of fast initial tack (about 2.5 seconds) and open times in excess of 20 seconds. The adhesive formulation of Example V meets these requirements completely.

At present, the combination of peroxide treatment, followed by a sodium hypochlorite oxidative thinning is preferred to acid hydrolysis to obtain the desired viscosity level for the starch-acrylamide copolymer. The oxidative thinning technique using the above reagents is relatively simple to control by limiting the amount of reagents used, and these reagents are more economical in the present supply situation. The reaction by-products are automatically removed, and create no food packaging problems with FDA regulations.

As with the adhesive formulations described above, the adhesive formulation of Example V can be made with a starch derivative which has already been cooked, and then spray dried. The CMC/PVOH components are then carefully dry blended with the pregelled starch derivative, so that it is not necessary for the tape manufacturer to cook the starch derivative at the time of adding water to make up the adhesive to apply to the reinforced tape. All that is then required is the addition of water to the correct solids level (about 48% solids).

EXAMPLE VI

With present chemical shortages and price increases, the following method of preparing the adhesive composition of the invention is preferred.

Unmodified waxy maize starch is first slurried to a minimum of 19.0° Be' ($\simeq$ 100° F.), disposed in a clean reactor and heated to about 108°-112° F. About 0.08 parts of ferrous sulfate pentahydrate per 100 parts of starch dry substance basis (dsb) is added with high speed stirring. About 1.73 parts of 35% hydrogen peroxide per 100 parts starch (dsb) is then added, after the first addition has been thoroughly mixed. The slurry is slowly agitated, and allowed to react for four hours. At the end of four hours, the alkali fluidity of the starch slurry should be in the range of 65-72 ml. for a 13.2 g. sample (dry substance starch) tested following the "quick alkali fluidity" test method set forth following this example. The pH is then adjusted to 10.7-11.0 using 5% (6-6.8° Be' $\simeq$100° F.) NaOH solution, added carefully through dip legs in the slurry reactor, and the slurry is held for an hour, and then pH readjusted to 10.7–11.0 if necessary.

The active chlorine content of a quantity of hypochlorite bleach is first assayed, and sufficient bleach is then added to the slurry to provide 2 parts active chlorine per 100 parts starch, dsb. The slurry is maintained at pH 10.0–10.5 with additions of 5% NaOH as required. The reaction is exothermic, and the slurry temperature may be expected to increase about 4°–45° F. The thinning reaction is allowed to continue for about 2 hours at a low agitation rate at a temperature in the range of 108°–112° F. The target cooked fluidity test indicating completion of the oxidative thinning step is 43–53 ml. using a 40.3 g. sample of starch, but experience indicates that a cooked fluidity in the range of 25–55 ml. is adequate, using 40.3 g. (continued on next page) of starch (dry substance basis), and the test method for "Cooked Fluidity" set forth below. If the fluidity is below 43 ml., a small additional amount of active chlorine (hypochlorite bleach) is added for slight additional thinning, while maintaining the slurry pH in the range of 10.0–10.5 with 5% NaOH. About 0.5 parts active chlorine per 100 parts starch, dsb, is adequate.

After attaining the target fluidity (43–53 ml.), the pH of the slurry is adjusted to 5.2–5.7 with 30° Be' $H_2SO_4$, and it is cooled to 95°–100° F. and recycled through the system while acrylamide pellets are added. About 11 parts acrylamide pellets per 100 parts starch, dsb, is added. Care must be taken in handling acrylamide. Rubber gloves, face mask and protective clothing (rubber or vinyl suit) should be worn, avoiding all contact with bare skin.

The reactor is then sealed and purged with $N_2$. $H_2O_2$ is then added under the surface of the slurry by means of a dip leg. About 0.555 part 35% $H_2O_2$ per 100 parts starch, dsb, is added during the acrylamide/starch polymerization reaction. About one eighth of the total is held back from the first addition for later adjustments.

A solution of erythorbic acid is next added to the slurry (5.08%—about 156 lbs. of dry substance erythorbic acid per 350 gallons of water). Sufficient acid solution is added to the slurry to calculate to 0.26 parts erythorbic acid per 100 parts starch, dsb. As the erythorbic acid solution is added, the slurry temperature may be expected to rise about 15° F. An oxidation spot test at this point should be positive.

Note: B. Oxidation Spot Test—Place 3 drops of slurry on white spot plate with a clean pipet. Add 2 drops of glacial acetic acid. Add 2 drops of a fresh 20% KI solution. Stir for about 5 sec. with pipet. Allow to stand for exactly 2 min. The test is negative if no color develops within 2 min. The test is positive if material turns to a light tan to brown color.

The slurry is then cooled to 108°–112° F., and the polymerization reaction is allowed to continue for about four hours, at which time the reaction should be complete, as indicated by a negative oxidation spot test. The reaction can be stopped by the addition of sodium bisulfite, if necessary.

The slurry is then subjected to high speed agitation, and slurry pH is adjusted as necessary to 5.0–6.0 pH by the addition of NaOH (6% maximum concentration). A glyceride anti-dusting agent is then added (Myvacet).

About 0.05 parts (Myvacet 9-45 from Distillation Products Co.) per 100 parts starch, dsb, is then added to the slurry with stirring. The slurry is filtered, but not washed, and then flash dried to about 10.5–11.5% moisture. The dried starch is then milled, ground and collected in a surge bin.

About 0.55 parts polyvinyl alcohol (about 88% hydrolyzed, e.g., Vinol 205 from Air Products, Inc.) per 100 parts "as is" starch is added to the modified starch by careful blending. A second addition of about 2 parts carboxymethylcellulose (Grade 7 LT from Hercules, Inc.) per 100 parts "as is" starch is also made to the modified starch, and the dry blended adhesive component ("A" of Example V) is ready for use when a suitable plasticizer, preferably $NaNO_3$ or urea, is added (about 6 parts plasticizer per 100 parts component "A") and sufficient water is added to make up an aqueous adhesive paste at 45–50% solids. It is convenient to bag and ship Component A to the tape/box manufacturing site, and the addition of the exact amount of plasticizer to suit particular automated tape gumming equipment and to obtain the desired "open" times and tape characteristics in the coated tape applicator equipment can be made there. Expensive shipping of water is also avoided. The complete synthesis of the adhesive composition, the mixing, formulation, pregumming, remoistening and container fabrication can, of course, all take place at one site.

QUICK ALKALI FLUIDITY TEST METHOD

The resistance to flow of the specially prepared, alkaline starch slurry is measured by means of an alkali fluidity funnel as set forth below. It is in one sense, a reciprocal to viscosity measurements, but usually is indicative of viscosity. The volume in ml. of the prepared solution which is delivered through the orifice of a standardized fluidity funnel in the same length of time which is required to deliver 100 ml. of distilled water is the "fluidity." This "water time" is checked on the funnel from time to time to insure accuracy, and should be 37–39 seconds.

This test was found to be a convenient means to monitor and control the level of thinning which takes place during the preparation of the low viscosity starch component of the subject adhesive composition. The same general test can be used to monitor and control the starch thinning process whether it be accomplished by acid hydrolysis, enzyme hydrolysis, or the various oxidative thinning methods.

The "quick alkali fluidity test" is generally described in U.S. Pat. No. 3,238,193 at the paragraph bridging columns 7 and 8. The concentration of the alkaline starch dispersion for a particular test sample was established by adding 80 ml. of 0.75 N sodium hydroxide to the thinned starch slurry containing 13.2 grams of the starch derivative, dry solids basis (d.s.b.). (At 18° Be', 34.2 ml. of the starch slurry contains 13.2 g. of starch, dsb.) Then 80 ml. of 0.75 N NaOH is added to the slurry, and after mixing, a paste is obtained. This suspension is stirred at between 450 and 460 rpm for exactly 2 minutes, 55 seconds, allowing an additional 5 seconds for the stirrer to stop, for a total of 3 minutes of stirring to completely disperse (swell) the starch. The resulting starch dispersion is immediately poured into a stoppered fluidity funnel having a specific "water time" between about 37–39 seconds. The inside of the funnel tip is "lubricated" or wetted by allowing a small amount of the suspension to pass through prior to the test. This amount is recollected and put back in the funnel. The plunger valve in the funnel is then opened to allow the starch suspension to pass through for the "water time," which is carefully controlled using a stopwatch. The number of ml. of starch solution which flows through the funnel in the "water time" is the alkali fluidity of the starch. The extent of thinning of the starch is monitored by repeating the above test at regular intervals with samples taken from the reaction mixture. When the alkali fluidity test is within the desired range, the thinning reaction is stopped.

The fluidity funnel used for the alkali fluidity tests described herein comprises two main parts, a funnel body and a funnel tip threadably attached thereto. A simple plunger-type, tapered valve on a glass stem is used to manually control flow through the funnel orifice. The funnel parts are precision-machined from stainless steel stock, and polished to very smooth surfaces on all parts which come in contact with the test samples.

The funnel body defines a generally cone shaped vessel having a sixty degree angle (or taper) between opposite, converging funnel walls. Funnel body height is sufficient to hold at least a 100 ml. sample, and a 0.277 orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the "water time" of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inch in length. The total height from the lower end of the funnel body passage to the lower external orifice of the funnel tip includes the height of the ball chamber (0.1008 inches) and the length (0.0492 inch) of the funnel tip opening.

The composite apparatus described above is vertically disposed above a graduated cylinder for the actual tests. The "water time" for the funnel is checked by running 100 ml. of pure water through the funnel and recording the total elapsed time, and should be about 37–39 seconds. The "water time" then becomes the time against which each sample is tested.

The flow through the funnel during the "water time" is measured in milliliters and recorded after each test. The funnel is thoroughly washed between tests to avoid irregular observations.

COOKED FLUIDITY TEST

A 400 ml. slurry sample of the oxidatively thinned starch is removed from the reactor and immediately adjusted to 6.5-7.0 pH with 30° Be' $H_2SO_4$ with thorough mixing. The time the sample was removed is observed and recorded. Then 300 ml. of the neutralized thinned starch slurry is filtered (Buchner funnel, 18.5 cm. Whatman #2 filter paper). The filter cake is crumbled through a #10 U.S. Screen, which is then analyzed for moisture. The amount of filter cake which contains 40.3 g. starch, dsb is placed in a 250 ml. glass beaker, and tap water is added to give a total weight of wet cake and water of 152 g.

The starch is slurried by stirring the sample with a mercury Fahrenheit thermometer. The beaker containing the sample is then placed in boiling water and heated to 185° F. with constant stirring (3-3½ minutes required). At 185° F., a timer is set for exactly five minutes, and cooking of the sample at 185° F. is continued with five seconds of stirring at one minute intervals. At the end of the five minute cook, the sample is removed from the heat source and poured through a 40–50 mesh screen into another beaker. The paste is force cooled to 133°–134° F. by continuous hand stirring in a 70°–80° F. water bath. Final cooling to 128° F. is then accomplished by cooling in air with stirring. The sample is then immediately poured into a standardized alkali fluidity funnel, with plunger valve closed. A small amount of the starch sample is passed through the funnel tip to wet it, and is recollected. The funnel is initially maintained at 77° F. for these tests. The plunger valve is then opened, while carefully timing the open valve period to remain open for the "water time" of the funnel, as described above, time for 100 ml. of distilled water to pass through the funnel. The fluidity funnel used here is the same as described above for the "quick" alkali fluidity test.

The above fluidity tests are employed as process control steps which have proved to be reliable methods for obtaining the correct ranges of low viscosity starch derivatives which are then polymerized to obtain starch derivative components for the adhesive compositions of this invention.

An exhaustive test program was conducted to evaluate many possible combinations of starch based adhesives which might replace all or part of the animal glue in rapidly remoistenable pregummed tapes, which are particularly used in automatic box-making machines. The most important criteria in these evaluations were: rapid development of initial tack strength, and "open" times up to thirty seconds or longer. Bond strength measured by percent fiber pull was also considered an important property for these pregummed tapes. Other secondary, but important, considerations in the evaluation were: wet curl, dry curl and gloss. The Werle Tack Tester and adhesive cooking and test sample preparation procedure described above was used throughout the tests, so that the most objective comparisons could be made. Many and varied chemical modifications of waxy maize starch were evaluated, including: acid hydrolyzed waxy maize starch, hydroxyethyl and hydroxypropyl waxy maize starches (both acid-hydrolyzed and not acid-hydrolyzed), acid-hydrolyzed quaternary ammonium waxy maize starch derivtives of varying degrees of substitution, acid-hydrolyzed carboxy methyl waxy maize starch derivatives (at different COOH levels), acid hydrolyzed, hydrogen peroxide oxidized, cyanoethyl waxy maize starch, and many others in addition to the two derivatized products of the invention. The overall results focused attention on the two derivatized starches of the invention as particularly good replacements for substantially all of the animal glue in remoistenable, reinforced, pregummed tapes. In all tests, these two starch derivatives were far superior in performance to other starch derivatives tested.

A most interesting and surprising observation was that the gel strength of the particular animal glue used in the formulation did not seem to affect the final performance of the pregummed tape adhesive. In Canadian Patent No. 850,534, hide glue having a gel strength of at least 100 gms is required. Applicants have discovered that any animal glue seems to work well in their adhesive composition and gel strength may be considerably lower than 100 gms. For example, animal glue having a gel strength of only 81 gms has been used successfully.

The exact basis for this apparent synergistic behavior between the particular starch derivatives of the invention and the animal glue is not known at present. However, since both derivatized starches have nitrogen containing groups attached to the starch molecules by particular bonds (apparently not the same as the quaternary ammonium starch derivative) it is believed there is some definitive enhancing action on the animal glue protein by the nitrogen portions of these starch derivative molecules. All that is presently known is that the improved performance of these two starch derivatives was consistently repeated, and they are presently the best possible broad range starch derivative replacements for animal glue in remoistenable, pregummed reinforced tapes in which rapid tack development is important, and long "open" times are desirable.

As mentioned above, it is also contemplated that the particular starch derivatives of the invention may be used in combination with other ingredients besides animal glue. If the above theory is correct, it is believed possible to replace the animal glue with high protein vegetable materials such as soy protein, and possibly laboratory synthesized protein materials. The possibilities for complete independence of fluctuating world supplies of animal glue in pregummed tapes appear to be excellent at this time.

Since many embodiments of this invention may be made and since many changes may be made in the embodiments described, the foregoing is interpreted as illustrative and the invention is defined by the claims appended hereafter.

We claim:

1. A remoistenable adhesive composition suitable for use on pregummed substrates consisting essentially of a low viscosity starch-acrylamide graft copolymer, the starch of said copolymer being selected from the group consisting of waxy maize, waxy milo, tapioca and potato starches and having a cooked fluidity of 43–53 ml.; animal glue; and sufficient water to provide a solids content of 30–60%, and in which the weight ratio of said copolymer to animal glue is in the range of 9:1 to 1:9 dry substance basis.

2. A remoistenable adhesive composition suitable for use on pregummed substrates consisting essentially of a low viscosity starch-acrylamide graft copolymer, the starch of said copolymer being selected from the group consisting of waxy maize, waxy milo, tapioca and potato starches, and having a cooked fluidity of 43–53 ml.; polyvinyl alcohol in a weight ratio of about 60:1 of graft copolymer to polyvinyl alcohol; and water in an amount sufficient to provide a liquid adhesive composition prior to drying of about 45–55% solids.

3. An adhesive composition for remoistenable pregummed tape requiring open times greater than 20 seconds and tack times less than 2.5 seconds, consisting essentially of:

(a) at least 90% by weight of a derivatized, thinned, starch-acrylamide graft copolymer, the starch portion of said copolymer being selected from the group consisting of root and root-type starches and having a cooked fluidity in the range of 43–53 ml.;

(b) from 1–2.9% by weight of a hydrophilic substance for improving rewetting characteristics of said pregummed tape selected from the group consisting of carboxymethylcellulose, methyl ether of cellulose and hydroxyethyl cellulose; and (c) from about 0.25–1.9% by weight of a partially hydroylzed polyvinyl alcohol for improving tack and rewet characteristics of said pregummed tape.

4. The adhesive composition of claim 3, wherein the hydrophilic substance is carboxymethylcellulose and is present in the range of about 1.7–2.3% by weight, and the polyvinyl alcohol contains about 20% polyvinyl acetate, and is present in an amount from about 0.5% to about 1% by weight.

5. The adhesive composition of claim 2, wherein the starch is a hydrolyzed waxy maize starch.

6. The method of making an adhesive composition for remoistenable pregummed fiber reinforced tapes, the steps consisting essentially of admixing, as the adhesive component, about 1–2.9% by weight carboxymethylcellulose; about 0.25–1.9% by weight polyvinyl alcohol which is no more than about 97% hydrolyzed; and a reduced viscosity starch-acrylamide graft copolymer, said starch being selected from the group consisting of waxy maize, waxy milo, tapioca and potato starches, and having a cooked fluidity in the range of 43–53 ml.; admixing about 3–10 parts of a plasticizer component to about 100 parts of said starch-acrylamide graft copolymer/carboxymethylcellulose/polyvinyl alcohol component; admixing sufficient water with the said components to provide a 40–60% solids adhesive composition; and heating the mixture to a temperature sufficient to gelatinize the starch.

7. The method of claim 6, wherein the adhesive component consists essentially of:

(a) 94.2–99.75% by weight of reduced viscosity waxy maize starch-acrylamide graft copolymer;

(b) 1.7–2.9% by weight carboxymethylcellulose; and (c) 0.25–1.9% by weight polyvinyl alcohol; and adding sufficient water to make an adhesive composition having about 45–50% total solids.

8. The method of claim 6, further including a petrolatum lubricant, and wherein the plasticizer is selected from the group consisting of urea, sodium nitrate, mixtures of sodium nitrate and calcium chloride, sorbitol, corn syrup, sodium methacrylate, and mixtures thereof.

* * * * *